June 30, 1953  A. BEATTIE  2,643,730
RETROVERTED PASSAGE TYPE EXHAUST SILENCER
Filed Nov. 23, 1951
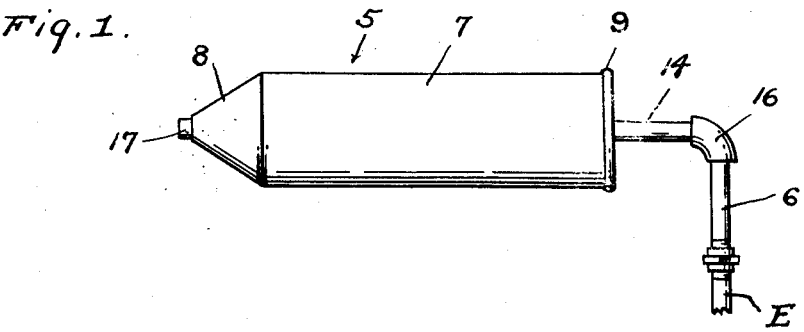
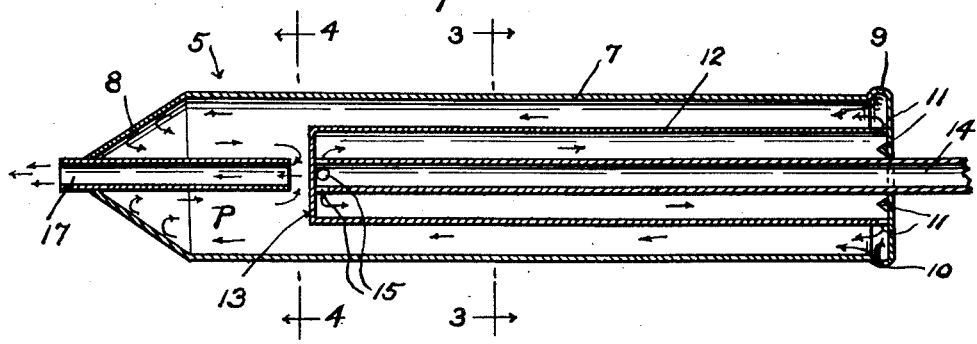
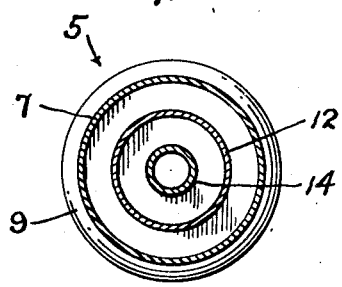
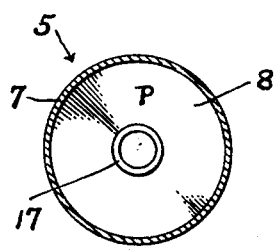
INVENTOR
*Arthur Beattie*
BY *L. B. James*
ATTORNEY

Patented June 30, 1953

2,643,730

UNITED STATES PATENT OFFICE 2,643,730

RETROVERTED PASSAGE TYPE EXHAUST SILENCER

Arthur Beattie, San Bernardino, Calif.

Application November 23, 1951, Serial No. 257,891

1 Claim. (Cl. 181—53)

This invention relates to the official class of mufflers and more particularly a new and efficient silencer for the exhaust conduits of grease rack hoists of automobile service stations.

The primary object of this invention resides in the provision of a silencer to be attached to the exhaust conduits of grease rack hoists of automobile service stations so as to modify or eliminate the usual noise caused thereby when releasing the pressure on the ram.

Another object of this invention resides in the provision of a silencer which will perform the aforesaid functions without choking the exhausted air or steam from the hoist operating system.

A further object of this invention resides in the particular construction of the silencer.

With these and other objects in view, this invention resides in certain novel features of construction and arrangement of elements to be hereinafter more particularly set forth in the specification, illustrated in the accompanying drawings and pointed out in the appended claim and, although this disclosure depicts my present conception of the invention, the right is reserved to resort to such departures therefrom as come within the scope of the claim.

In the accompanying drawings forming a part of this invention;

Fig. 1 is a side view of the silencer as shown attached to the exhaust pipe of a grease rack of an automobile service station.

Fig. 2 is an enlarged longitudinal sectional view through the silencer per se.

Fig. 3 is a cross sectional view taken approximately on line 3—3 of Fig. 2.

Fig. 4 is a cross sectional view taken approximately on line 4—4 of Fig. 2.

In the present illustration of this invention, the letter E designates the outlet end of the exhaust conduit of a grease rack used in automobile service stations to hoist automobiles in position for convenient greasing and the numeral 5 designates, in general, an elongated cylindrical silencer secured thereto through the instrumentality of a threaded pipe 6 or other suitable connection.

The silencer 5 is formed of an outer jacket 7 having a tapered front end 8 and an annular bulged inner end 9 at its inner end to form an internal air or steam passage 10 opposite exhaust ports 11 formed in the inner end of an inner jacket 12 which is secured to the inner end of the outer jacket in spaced disposition therefrom and provided with a closed outer end 13 having a main exhaust tube 14 centrally secured to its inner surface and provided with exhaust ports 15. Said exhaust tube 14 extends through the inner end of the outer jacket and is herein provided with an elbow 16 at its outer end to accommodate the aforesaid pipe 6 or other type of coupling required to connect the silencer to the exhaust conduit of the automobile rack operating system.

Secured to the apex of the outer jacket and extending inwardly with its inner end spaced from the outer end of the internal jacket is an air or steam discharge tube 17 of lesser diameter than that of the internal jacket.

With the silencer constructed as heretofore set forth, the air or steam released from the grease rack operating system is conducted along an irregular course through passages increasing in area toward and into an enlarged compartment P formed between the outer ends of the internal and external jackets from which it is directed in reverse direction along the periphery of the discharge tube by the tapered end of the outer jacket and thereafter caused to quietly flow through said tube as it encounters the outer closed end of the internal jacket. Through conducting the exhausted air or steam in the manner set forth, it will flow without undue interruption through the silencer and be expelled therefrom without back pressure.

With this invention fully set forth, it is manifest that means are provided whereby undue noise from the exhaust conduits of automobile grease racks in service stations is eliminated and, through the simplicity of construction thereof, the cost of manufacture of the same is reasonable.

Having thus described my invention, what I claim and desire to protect by Letters Patent is:

A silencer for the exhaust conduit of an automobile grease rack operated by fluid pressure comprising an elongated outer jacket having a tapered outer end and an annular outwardly bulged inner end forming an increased internal air passage communicating with an enlarged air passage within said jacket, an inner jacket centrally secured to the inner surface of the inner end of the outer jacket in spaced relation thereto and having a plurality of exhaust ports opposed to the aforesaid annular bulged inner end of the outer jacket, a main exhaust tube centrally extending into the inner jacket with its outer end sealed against and secured to the inner surface of the outer closed end of the inner jacket and provided with a plurality of exhaust ports adjacent the closed outer end of the inner jacket, a discharge tube secured to the apex of the outer jacket in axial alignment with the inner and outer jackets and extending inwardly with its inner open end spaced from the adjacent and opposed closed outer end of the inner jacket, and means securing the silencer to the aforesaid exhaust conduit.

ARTHUR BEATTIE.

References Cited in the file of this patent

UNITED STATES PATENTS

| Number | Name | Date |
|---|---|---|
| 598,845 | Bird | Feb. 8, 1898 |
| 830,660 | Goldman | Sept. 11, 1906 |
| 1,338,520 | Moores | Apr. 27, 1920 |
| 2,561,726 | Cherain | July 24, 1951 |